Aug. 3, 1965 W. R. DURAM 3,198,314
CONVEYOR FOR COMMINUTED MATERIALS
Filed Oct. 14, 1963 2 Sheets-Sheet 1
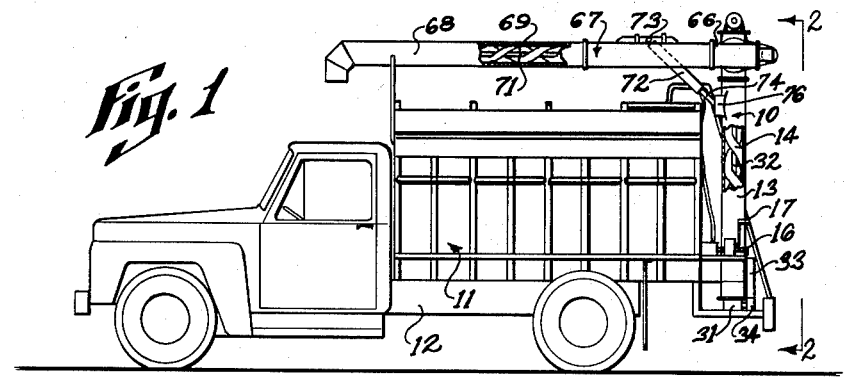
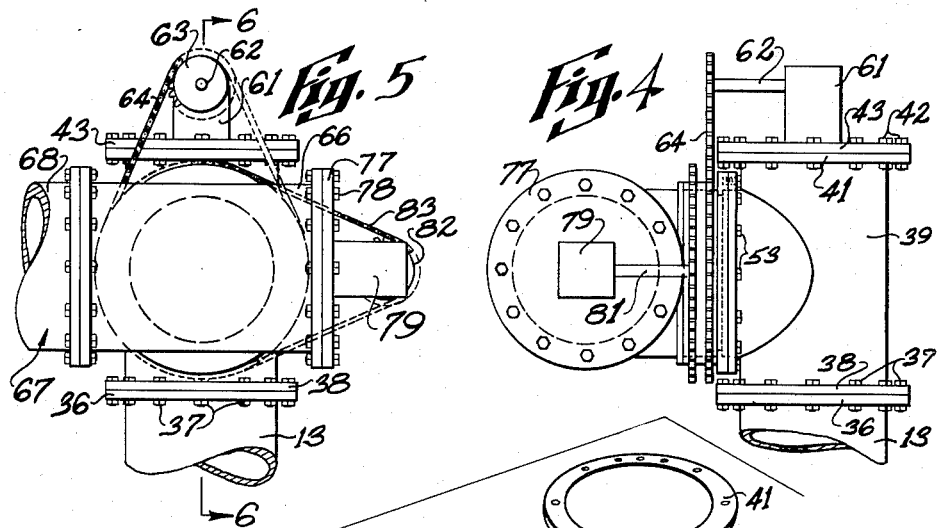
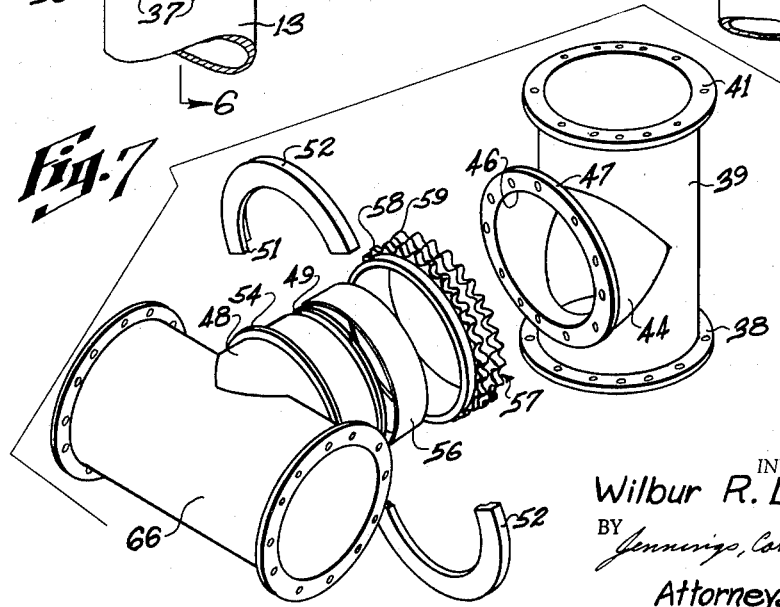
INVENTOR.
Wilbur R. Duram
BY
*Jennings, Carter & Thompson*
Attorneys

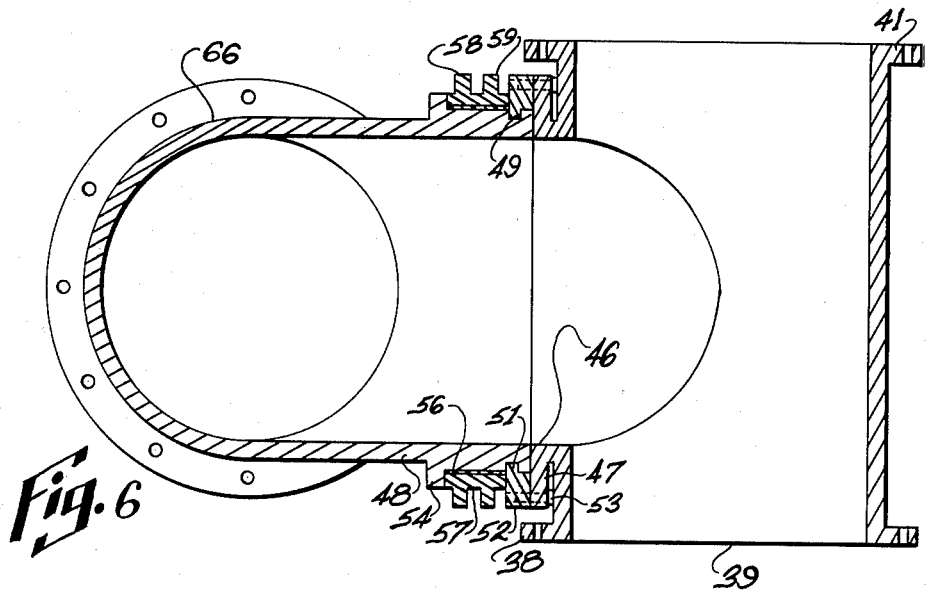
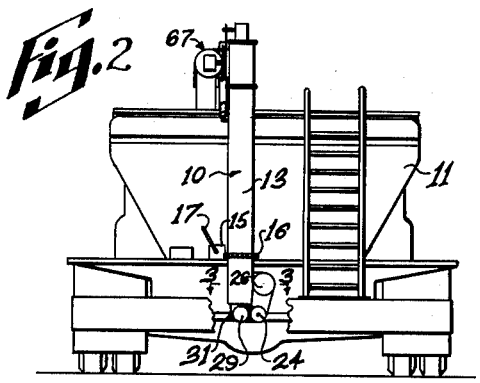
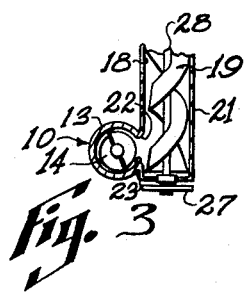

3,198,314
CONVEYOR FOR COMMINUTED MATERIALS
Wilbur R. Duram, Birmingham, Ala., assignor to Fontaine Truck Equipment Company, Incorporated, a corporation of Alabama
Filed Oct. 14, 1963, Ser. No. 315,935
1 Claim. (Cl. 198—88)

This invention relates to a conveyor for comminuted materials and more particularly to a conveyor for moving comminuted materials, such as animal feeds, grains and the like, from a source of supply and delivering it to another location.

An object of my invention is to provide a conveyor for comminuted materials which shall include separate conveyor tubes adapted for pivotal movement relative to each other, each tube having a self-contained auger for transferring material therethrough, together with improved means for transferring power from one auger to the other.

Another object of my invention is to provide a conveyor for comminuted materials of the character designated in which a discharge section thereof is adapted for rotation to selected angular positions without affecting the auger drive means.

A further object of my invention is to provide a conveyor for comminuted materials of the character designated which shall include a drive unit which may be connected to self-contained auger conveyor tubes with a minimum of effort, thereby permitting the apparatus to accommodate auger-type conveyor tubes of various lengths.

A still further object of my invention is to provide a conveyor for comminuted materials which shall be simple of construction, economical of manufacture, and one which may be constructed of light materials.

Heretofore in the art to which my invention relates, various types of conveyor units have been devised for transferring comminuted materials, such as animal feed from a supply bin to another location. However, so far as I am aware, such apparatus has been unsatisfactory due to the fact that complicated drive mechanism is required where one element of the conveyor is mounted for pivotal movement relative to another element thereof. Accordingly, in order to adapt the apparatus for carrying the complicated drive mechanism, heavy bearing support members and very sturdy conveying sections are required. Furthermore, the power transfer means for the pivoted conveyor sections has heretofore projected outwardly of the conveyor section a substantial distance whereby the overall strength of the conveying means is reduced greatly and at the same time the apparatus requires more parts and takes up more space.

To overcome the above and other difficulties, I provide a compact conveyor for comminuted materials which comprises a pair of conveying sections which are adapted for pivotal movement relative to each other and are connected to each other by a laterally directed tube whereby the material discharged from one conveying section is introduced into the other. Idler power transmitting means is mounted between the conveying sections for rotation about the pivotal axis therebetween and means is provided to transmit power from one conveying section to the other conveying section through the idler power transmitting means.

Apparatus embodying features of my invention is illustrated in the accompanying drawings, forming a part of this application, in which:

FIG. 1 is a side elevational view partly broken away showing my improved conveyor associated with a vehicle body for transporting animal feeds and the like;

FIG. 2 is a rear elevational view taken generally along line 2—2 of FIG. 1;

FIG. 3 is an enlarged fragmental view taken generally along the line 3—3 of FIG. 2;

FIG. 4 is an enlarged fragmental view taken from the rear and showing the power transmitting means between the conveying sections;

FIG. 5 is a side elevational view of the apparatus shown in FIG. 4;

FIG. 6 is an enlarged sectional view taken generally along the line 6—6 of FIG. 5; and, FIG. 7 is an exploded view showing the lateral connection between the conveying sections and the power transmitting means associated therewith.

Referring now to the drawings for a better understanding of my invention, I show a first conveying section 10 which is mounted for rotation in suitable bearing members adjacent the rear of a bin 11 for carrying comminuted materials, such as animal feed and the like. The bin 11 may be supported by a vehicle 12 in a manner well understood in the art. The conveying section 10 comprises a tube 13 having an auger 14 adapted for rotation therein. The tube 13 is rotated about its longitudinal axis by a sprocket and chain drive indicated generally at 16. A suitable handle 17 may be employed to impart rotation to the sprocket and chain drive 16 through a gear box 15 in a manner well understood in the art.

The side walls of the bin 11 extend downwardly and inwardly, as shown in FIG. 2, to provide a hopper-like bottom which terminates in a trough 18 that extends longitudinally of the bin. Mounted for rotation in the trough 18 is an auger 19. Communicating with the rear end of the trough 18 is a short tube-like member 21 which projects rearwardly of the bin 11. The tube-like member 21 is in alignment with the trough 18 whereby it receives the rear end of the auger 19, as shown in FIG. 3. A lateral discharge opening 22 is provided in the side of the tube-like member 21 in position to communicate with a lateral opening 23 provided in the lower portion of the tube 13 whereby comminuted materials are transferred from the bin 11 into the adjacent end of the tube 13. While I have shown the tube 13 as extending in a vertical direction, it will be apparent that the tube 13 could extend in other desired directions.

Extending rearwardly of the vehicle 12 is a power shaft 24 which is connected by a suitable drive connection, such as a sprocket and chain drive 26, to a sprocket 27 mounted at the rear end of a shaft 28 for the auger 19, as shown in FIG. 3. The drive shaft 24 is also connected by a suitable drive, such as a sprocket and chain drive 29, to a gear box 31 which is operatively connected to a drive shaft 32 for the auger 14, as shown in FIG. 1. Accordingly, the drive shaft 24 imparts rotary motion to the horizontal auger 19 and the vertical auger 14. By providing separate drive means between the power shaft 24 and the horizontal and vertical augers, the augers may be driven independently of each other by providing suitable clutch elements in the driving mechanism. Since such clutch elements are well known in the art and form no part of my invention, no further description thereof is deemed necessary. Preferably, the drive connections 26 and 29 are covered by suitable protective housings 33 and 34, respectively, as shown in FIG. 1.

As shown in FIGS. 4 and 5, the upper end of the tube 13 is provided with an outturned annular flange 36 which is connected by bolts 37 to an outturned annular flange 38 of a tubular section 39. The upper end of the tubular section 39 is provided with an outturned annular flange 41 which is connected by bolts 42 to a transverse plate 43. As clearly shown in FIG. 7, the tubular section 39 communicates with a lateral section 44 having a lateral discharge opening 46 therein. An annular flange 47 is provided on the lateral section 44, as shown.

Pivotally connected to the annular flange 47 is one end of a laterally directed tube 48. An annular groove 49 is provided adjacent one end of the laterally directed tube 48 in position to receive an inturned annular flange 51 carried by a split locking ring 52. As shown in FIG. 6, the locking ring 52 is generally L-shaped, as viewed in cross section and is provided with a plurality of openings therein for receiving retaining bolts 53 which secure the locking ring 52 to the annular flange 47 whereby the laterally directed tube 48 is adapted for rotation relative to the tube section 39 of the conveying section 10.

An outturned annular flange 54 is carried by the laterally directed tube 48 in spaced relation to the groove 49 and split ring 52, as shown in FIG. 6. An annular bearing member, such as a nylon bushing 56 surrounds the laterally directed tube 48 intermediate the annular flange 54 and the split ring 52. Mounted for rotation on the annular bearing member 56 is a double row idler sprocket-like member 57 having laterally spaced rows of teeth 58 and 59.

Mounted on the transverse plate 43 of the conveying section 10 is a gear box 61 which operatively connects the upper end of the auger shaft 32 to an outwardly extending shaft 62. A sprocket 63 is mounted adjacent the end of the shaft 62 and a sprocket chain 64 connects the sprocket 63 to the row of teeth 59 of the idler sprocket member 57 whereby rotary motion is imparted thereto.

The laterally directed tube 48 communicates with and is secured to a tube section 66 of a second conveying section indicated generally at 67 whereby the laterally directed tube extends at right angles to both tube sections 39 and 66. The tube section 66 is connected to an elongated discharge tube 68, as shown in FIG. 1. Mounted for rotation within the tube 68 and the tube section 66 of the conveying section 67 is an auger 69 having a shaft 71. The conveying section 67 is moved to selected angular positions relative to the vertical conveying section 10 by suitable means, such as a fluid pressure operated cylinder 72 which is pivotally mounted as at 73 to the conveying section 67. The cylinder 72 is provided with a piston rod 74 which is pivotally connected as at 76 to the upper portion of the conveying section 10.

A transverse plate 77 is secured by bolts 78 to the end of the tube section 66 opposite the end thereof connected to the tube 68, as shown in FIGS. 3 and 4. Mounted on the transverse plate 77 is a gear box 79 having an input shaft 81. A sprocket 82 is mounted on the shaft 81 and is operatively connected to the row of teeth 58 of the idler member 57 by a sprocket chain 83 whereby rotary motion is imparted from the idler member 57 to the gear box 79. The output side of the gear box 79 is operatively connected to the shaft 71 for the auger 69 whereupon rotary motion is imparted to the auger 69 to thus discharge materials from the discharge tube 68.

From the foregoing description, the operation of my improved conveying apparatus will be readily understood. The vertical conveying section 10 is rotated by turning the crank 17 and the horizontal conveying section 67 is elevated by energizing the fluid pressure operated cylinder 72 whereby the discharge conduit 68 extends in the proper direction and at the proper elevation to convey the materials to a selected location. Upon rotation of the drive shaft 24, the horizontal auger 19 in the bottom of the feed bin 11 conveys the materials into the receiving or lower end of the vertical conveying section 10. Since the drive shaft 24 also drives the vertical auger 14, the materials are conveyed upwardly and discharged through the opening 46 into the laterally directed tube 48. The materials are then discharged into the conveying section 67.

Power is transferred to the input side of the gear box 61 by the vertical shaft 32. Power is then transferred to the idler sprocket-like member 57 through the shaft 62, sprocket 63 and sprocket chain 64. Rotary motion is imparted to the input shaft 81 of the gear box 79 by the sprocket 82 and sprocket chain 83 whereupon the shaft 71 and auger 69 are rotated. It will thus be seen that rotary motion is continuously transferred from the auger shaft 32 to the auger shaft 71 regardless of the position of the conveying sections 10 and 67 relative to each other. That is, by providing the idler sprocket member 57 which rotates about the axis of the pivotal connection between the conveying sections 10 and 67, the sprockets 63 and 82 always remain equidistant from the pivotal axis between the conveying section 67 and the conveying section 10.

From the foregoing, it will be seen that I have devised an improved conveyor for comminuted materials. By providing a compact drive unit between the pivoted conveying sections, I not only reduce the overall size of the apparatus but add greatly to the overall strength thereof without the necessity of a heavy structure. Also, by providing the idler sprocket-like member which may be readily installed and removed from the laterally directed tube, the apparatus may be assembled and disassembled with a minimum of effort. Furthermore, by providing a composite power transfer unit between the conveying sections, together with tubular sections which may be readily connected to other tubular members of various lengths, the overall length of the conveying sections may be varied with a minimum of effort.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claim.

What I claim is:

In apparatus for discharging comminuted material from a bin and the like, (a) a generally vertically arranged conveyor embodying an outer vertical tube mounted for rotation about its longitudinal axis and a vertical power driven auger therein for elevating material, (b) means to rotate said vertical tube to selected angular positions, (c) means to deliver material into the lower part of the vertical tube for upward movement by the vertical auger, (d) a laterally directed tube pivotally connected at one end to and communicating with the vertical tube adjacent the top thereof into which material is delivered by the vertical auger, (e) a material discharge tube connected rigidly at one end to and communicating with the other end of said laterally directed tube for receiving material delivered therefrom whereby said material discharge tube is adapted for movement with said laterally directed tube in a plane parallel to the longitudinal axis of said vertical tube, (f) a power unit interposed between said vertical tube and said material discharge tube to move said material discharge tube relative to said vertical tube,
(g) an auger mounted within the discharge tube to convey material therethrough,
(h) a gear box having a power take-off sprocket adjacent the top of the vertical tube and driven by the vertical auger therein,
(i) a gear box having a power input sprocket adjacent said one end of the discharge tube operatively connected to transmit power to and drive the auger therein,
(j) a pair of idler power transmitting sprockets mounted for rotation between the vertical and discharge tubes and rotatable about said laterally directed tube,
(k) means limiting axial movement of said power transmitting sprockets relative to said laterally directed tube, and
(l) sprocket chains to transmit power from said power take-off means to said power input means through said idler power transmitting sprockets.

References Cited by the Examiner
UNITED STATES PATENTS

| | | | |
|---|---|---|---|
| 838,145 | 12/06 | Steele | 198—99 |
| 1,518,898 | 12/24 | Brunner | 198—88 |
| 2,633,255 | 3/53 | Hoffstetter | 198—64 X |

SAMUEL F. COLEMAN, *Primary Examiner.*

WILLIAM B. LA BORDE, *Examiner.*